United States Patent
Kashiwagi

(10) Patent No.: US 9,529,148 B2
(45) Date of Patent: Dec. 27, 2016

(54) OPTICAL FIBER AND FIBER LASER DEVICE USING SAME

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 27 days.

(21) Appl. No.: 14/432,347

(22) PCT Filed: Sep. 25, 2013

(86) PCT No.: PCT/JP2013/075826
§ 371 (c)(1),
(2) Date: Mar. 30, 2015

(87) PCT Pub. No.: WO2014/054480
PCT Pub. Date: Apr. 10, 2014

(65) Prior Publication Data
US 2015/0253497 A1    Sep. 10, 2015

(30) Foreign Application Priority Data
Oct. 2, 2012   (JP) ................................ 2012-220588

(51) Int. Cl.
*G02B 6/02* (2006.01)
*G02B 6/024* (2006.01)
(Continued)

(52) U.S. Cl.
CPC ........... *G02B 6/02047* (2013.01); *G02B 6/024* (2013.01); *G02B 6/03694* (2013.01);
(Continued)

(58) Field of Classification Search
CPC ............. G02B 6/02047; H01S 3/06729; H01S 3/0804; H01S 3/08059; H01S 3/094003; H01S 3/094042
See application file for complete search history.

(56) References Cited

U.S. PATENT DOCUMENTS 5,309,540 A * 5/1994 Turpin .............. C03B 37/01217
385/11
5,818,630 A   10/1998 Fermann et al.
(Continued)

FOREIGN PATENT DOCUMENTS

EP   0883001 A1   12/1998
EP   2388871 A1   11/2011
(Continued)

OTHER PUBLICATIONS

International Search Report dated Dec. 17, 2013, issued in corresponding application No. PCT/JP2013/075826.
(Continued)

*Primary Examiner* — Xinning Niu
(74) *Attorney, Agent, or Firm* — Westerman, Hattori, Daniels & Adrian, LLP

(57) ABSTRACT

An optical fiber 10 propagates a light beam at a predetermined wavelength at least in an LP01 mode and an LP02 mode. In regions 11a and 11c in which the intensity of a light beam in the LP02 mode is greater than the intensity of a light beam in the LP01 mode, at least a part of a Young's modulus in the region 11c on the circumferential side of the region 11b in the core in which the intensity of the light beam in the LP01 mode is greater than the intensity of the light beam in the LP02 mode is smaller than a Young's modulus in the region 11b in which the intensity of the light beam in the LP01 mode is greater than the intensity of the light beam in the LP02 mode.

20 Claims, 5 Drawing Sheets

(51) Int. Cl.
*H01S 3/067* (2006.01)
*H01S 3/08* (2006.01)
*G02B 6/036* (2006.01)
*H01S 3/094* (2006.01)
*H01S 3/0941* (2006.01)

(52) U.S. Cl.
CPC ...... *H01S 3/06729* (2013.01); *H01S 3/06733* (2013.01); *H01S 3/06754* (2013.01); *H01S 3/0804* (2013.01); *H01S 3/08059* (2013.01); *H01S 3/094042* (2013.01); *H01S 3/0675* (2013.01); *H01S 3/09415* (2013.01); *H01S 3/094003* (2013.01)

(56) References Cited

U.S. PATENT DOCUMENTS

| | | | |
|---|---|---|---|
| 6,222,972 | B1 | 4/2001 | Yamamoto et al. |
| 7,130,514 | B1* | 10/2006 | Chen ................ G02B 6/03611 385/123 |
| 2007/0116416 | A1 | 5/2007 | Chen et al. |
| 2008/0131062 | A1* | 6/2008 | Sendai ................ C03C 25/1065 385/100 |
| 2011/0091177 | A1 | 4/2011 | Gapontsev et al. |
| 2011/0149383 | A1* | 6/2011 | Kashiwagi ............ H01S 3/0804 359/341.3 |
| 2011/0305251 | A1 | 12/2011 | Tanigawa et al. |
| 2012/0105947 | A1 | 5/2012 | Kashiwagi et al. |

FOREIGN PATENT DOCUMENTS

| | | |
|---|---|---|
| JP | 10-160947 A | 6/1998 |
| JP | 2008-293004 A | 12/2008 |
| JP | 2008-547048 A | 12/2008 |
| JP | 2008-547049 A | 12/2008 |
| JP | 2012-088356 A | 5/2012 |
| JP | 2012-099649 A | 5/2012 |
| WO | 2007/053198 A2 | 5/2007 |
| WO | 2010/146792 A2 | 12/2010 |

OTHER PUBLICATIONS

Extended (supplementary) European Search Report dated May 11, 2016, issued in counterpart European Patent Application No. 13844427.8. (8 pages).

* cited by examiner

REFRACTIVE INDEX

LIGHT INTENSITY
LP02
LP01
WAVEGUIDE REGION

YOUNG'S MODULUS

ACTIVE ELEMENT CONCENTRATION 12a 11c 11b 11a 11b 11c 12a

OPTICAL FIBER AND FIBER LASER DEVICE USING SAME

TECHNICAL FIELD

The present invention relates to an optical fiber that can emit a light beam of excellent beam quality even in the case where the core diameter is great and a fiber laser device using the same.

BACKGROUND ART

For one of fiber laser devices for use in a processing machine, for example, an MO-PA (Master oscillator-Power Amplifier) fiber laser device is known in which a light beam generated from a seed light source such as a laser oscillator (Master oscillator (MO)) is amplified at an amplifier (a Power Amplifier (PA)) including an amplification optical fiber and emitted. For such a fiber laser device, a wavelength conversion element is used to convert a light beam having a wavelength range of near infrared light into a short wavelength side, and a light beam having a wavelength range of visible light is emitted.

In performing wavelength conversion like this, when a light beam before wavelength conversion includes a large number of modes, such a tendency is observed that it is not enabled to efficiently perform wavelength conversion. For this reason, it is desirable that only a light beam in a fundamental mode be included in an incident light beam to a wavelength conversion element as much as possible and a light beam in a higher mode be not included. On the other hand, in association with a high output fiber laser device, it is desired to use a multimode fiber whose core diameter is greater than that of a single mode fiber for an optical fiber such as an amplification optical fiber in order to propagate a light beam of greater power. Even in this case, it is desired to emit a light beam of excellent beam quality that a light beam in a fundamental mode is included and a light beam in a higher mode is decreased.

Patent Document 1 below describes a fiber laser device including an amplification double cladding fiber that can propagate a multimode light beam. In this fiber laser device, a mode converter that excites only a light beam in an LP01 mode (a fundamental mode) so as to include only a light beam in the LP01 mode in an incident light beam to a core, and the light beam in the LP01 mode can be mainly amplified in an amplification double cladding fiber that propagates a light beam in a multimode.

CITATION LIST

Patent Document

[Patent Document 1] U.S. Pat. No. 5,818,630

SUMMARY OF INVENTION

Objects to be Achieved by the Invention

However, even in the case where only a light beam in the LP01 mode is entered to an optical fiber that can propagate a light beam in a multimode, a light beam in a higher mode such as a light beam in an LP02 mode is excited other than the light beam in the LP01 mode. When a light beam in a higher mode such as the LP02 mode is excited in the amplification optical fiber described in Patent Document 1, in addition to the light beam in the LP01 mode, these light beams in higher modes are amplified, and a light beam whose beam quality is not excellent is emitted. When a light beam including a light beam in a higher mode is emitted as described above, a problem arises in that a light beam emitted is not easily condensed, for example, or a problem arises in that it is not enabled to efficiently perform wavelength conversion in a wavelength conversion element as described above. Since such a tendency is observed that the light beam in the LP02 mode has power greater than the power of light beams in the other higher modes, it is important to suppress the light beam in the LP02 mode among light beams in other higher modes.

Therefore, it is an object of the present invention is to provide an optical fiber that can emit a light beam of excellent beam quality even in the case where the core diameter is great and a fiber laser device using the same.

Means for Achieving the Objects

To achieve the above object, the present invention provides an optical fiber including: a core and a cladding that encloses the core, the optical fiber being configured to propagate a light beam at a predetermined wavelength at least in an LP01 mode and an LP02 mode, wherein in a region in which an intensity of the light beam in the LP02 mode is greater than an intensity of the light beam in the LP01 mode, at least a part of a Young's modulus in a region on a circumferential side of a region in the core in which the intensity of the light beam in the LP01 mode is greater than the intensity of the light beam in the LP02 mode is smaller than a Young's modulus in the region in which the intensity of the light beam in the LP01 mode is greater than the intensity of the light beam in the LP02 mode.

Stimulated Brillouin scattering is caused by an interaction between a light beam and acoustic waves propagated through an optical fiber. Such a tendency is observed that the acoustic waves are gathered at a portion where a Young's modulus is small. Therefore, according to the optical fiber, in the core, acoustic waves are gathered in a region on the circumferential side of a region in which the intensity of the light beam in the LP01 mode is greater than the intensity of the light beam in the LP02 mode. Since the region is also a region in which the intensity of the light beam in the LP02 mode is greater than the intensity of the light beam in the LP01 mode and the second peak of the LP02 mode exists, in the region, the light beam in the LP02 mode is more greatly affected by stimulated Brillouin scattering than the light beam in the LP01 mode. Therefore, the light beam in the LP02 mode can be propagated as the light beam in the LP02 mode is attenuated more than the light beam in the LP01 mode. Moreover, in the region, since the intensity of the light beam in the LP01 mode is small, the loss in the LP01 mode caused by stimulated Brillouin scattering is not greater than the loss of the light beam in the LP02 mode. Therefore, according to the optical fiber described above, even in the case where the core diameter is great, the light beam in the LP02 mode can be attenuated while suppressing the loss of the light beam in the LP01 mode, and a light beam of excellent beam quality can be emitted.

Furthermore, preferably, in the region in which the intensity of the light beam in the LP02 mode is greater than the intensity of the light beam in the LP01 mode, a Young's modulus in an entire region on the circumferential side of the region in the core in which the intensity of the light beam in the LP01 mode is greater than the intensity of the light beam in the LP02 mode is smaller than a Young's modulus in the region in which the intensity of the light beam in the LP01 mode is greater than the intensity of the light beam in the LP02 mode.

According to the optical fiber, the light beam in the LP02 mode can be further attenuated and propagated.

In addition, a refractive index of the core may be constant in a radial direction.

Moreover, preferably, at least a part of a Young's modulus in a waveguide region in the cladding through which the light beam at the predetermined wavelength is propagated is smaller than a Young's modulus in the region in which the intensity of the light beam in the LP01 mode is greater than the intensity of the light beam in the LP02 mode.

Generally, the mode field diameter of a light beam propagated through the core is greater than the core diameter. In other words, the light beam propagated through the optical fiber is extended and propagated from the core to the region in the cladding adjacent to the core. In the optical waveguide region in the cladding, the intensity of the light beam in the LP02 mode is greater than the intensity of the light beam in the LP01 mode. Therefore, the Young's modulus in the waveguide region in the cladding is made smaller to gather acoustic waves in the region, so that the light beam in the LP02 mode can be further attenuated than the light beam in the LP01 mode.

Furthermore, preferably, a Young's modulus in all of the waveguide region in the cladding is smaller than a Young's modulus in the region in which the intensity of the light beam in the LP01 mode is greater than the intensity of the light beam in the LP02 mode.

According to the optical fiber, the light beam in the LP02 mode can be further attenuated and propagated in the waveguide region in the cladding.

In this case, preferably, in the region in which the intensity of the light beam in the LP02 mode is greater than the intensity of the light beam in the LP01 mode, at least a part of a Young's modulus in the region on the circumferential side of the region in the core in which the intensity of the light beam in the LP01 mode is greater than the intensity of the light beam in the LP02 mode is smaller than a Young's modulus in the waveguide region in the cladding.

A Young's modulus is defined in a part of the core and in a part of the cladding in this manner, so that in the region in which the intensity of the light beam in the LP02 mode is greater than the intensity of the light beam in the LP01 mode, acoustic waves can be gathered more than in the region on the circumferential side of the region in the core in which the intensity of the light beam in the LP01 mode is greater than the intensity of the light beam in the LP02 mode, as compared with the waveguide region in the cladding. The difference between the intensity of the light beam in the LP02 mode and the intensity of the light beam in the LP01 mode is greater in the region in the core than in the waveguide region in the cladding. Therefore, acoustic waves are gathered in the region in the core more than in the waveguide region in the cladding, so that the influence of stimulated Brillouin scattering can be increased in the region in the core more than in the waveguide region in the cladding. Thus, the loss of the light beam in the LP02 mode can be more increased than the loss of the light beam in the LP01 mode. Accordingly, it is possible to further improve beam quality.

Moreover, a refractive index of the cladding may be constant in a radial direction.

Furthermore, preferably, in the region having a Young's modulus smaller than a Young's modulus in the region in which the intensity of the light beam in the LP01 mode is greater than the intensity of the light beam in the LP02 mode, a dopant that increases a refractive index as well as decreases a Young's modulus and a dopant that decreases a refractive index as well as decreases a Young's modulus are doped together.

A dopant that increases a refractive index as well as decreases a Young's modulus and a dopant that decreases a refractive index as well as decreases a Young's modulus are doped together, so that the Young's modulus can be decreased as well as the refractive index can be set in a desired state. For example, in the case where the region having a Young's modulus smaller than a Young's modulus in the region in which the intensity of the light beam in the LP01 mode is greater than the intensity of the light beam in the LP02 mode is the region in the core, the same refractive index can be provided in the region and in the other regions in the core as the Young's modulus in the region is made smaller. Similarly, in the case where the region having a Young's modulus smaller than a Young's modulus in the region in which the intensity of the light beam in the LP01 mode is greater than the intensity of the light beam in the LP02 mode is the waveguide region in the cladding, the same refractive index can be provided in the waveguide region and in the other regions in the cladding as the Young's modulus in the waveguide region is made smaller.

In addition, it may be fine that at least a part of the core is doped with an active element that is stimulated to emit the light beam at the predetermined wavelength. In this case, it is possible to implement an amplification optical fiber that can attenuate the light beam in the LP02 mode.

Moreover, preferably, at least a part of the region in which the intensity of the light beam in the LP01 mode is greater than the intensity of the light beam in the LP02 mode is doped with the active element at a concentration higher than in the region in the core having a Young's modulus smaller than a Young's modulus in the region in which the intensity of the light beam in the LP01 mode is greater than the intensity of the light beam in the LP02 mode.

The region in the core having a Young's modulus smaller than a Young's modulus in the region in which the intensity of the light beam in the LP01 mode is greater than the intensity of the light beam in the LP02 mode is a region in which the light beam is to be attenuated due to stimulated Brillouin scattering. Therefore, a light beam is amplified in the region in which the intensity of the light beam in the LP01 mode is greater than the intensity of the light beam in the LP02 mode as compared with the region, so that the light beam in the LP01 mode can be efficiently amplified.

Furthermore, preferably, the region in the core having a Young's modulus smaller than a Young's modulus in the region in which the intensity of the light beam in the LP01 mode is greater than the intensity of the light beam in the LP02 mode is not doped with any active element.

Any active element is not doped to the region in which the light beam in the LP02 mode is to be attenuated due to stimulated Brillouin scattering, so that the light beam in the LP02 mode can be further attenuated.

In addition, preferably, a pair of stress application parts sandwiching the core is provided in the cladding. These stress application parts are provided, so that a light beam propagated through the core can be a light beam of single polarization. The light beam of single polarization is emitted from the optical fiber, so that the wavelength of a light beam can be efficiently converted when a light beam emitted from the optical fiber is entered to the wavelength conversion element and the wavelength is converted.

Moreover, a fiber laser device according to the present invention is a fiber laser device including: any one of the optical fibers described above in which at least a part of a core is doped with an active element; a seed light source configured to emit a seed light beam at the predetermined wavelength to be entered to the core; and a pumping light source configured to emit a pumping light beam that pumps the active element.

According to the fiber laser device, the light beam in the LP01 mode can be amplified while attenuating the light beam in the LP02 mode in the optical fiber, so that a light beam of excellent beam quality can be emitted.

Furthermore, preferably, in the fiber laser device, the seed light beam excites only an axial symmetry mode in the optical fiber.

According to the fiber laser device, since higher modes in axial asymmetry are not propagated through the optical fiber, higher modes in axial asymmetry are not amplified and emitted, so that a light beam of excellent beam quality that is easily condensed can be emitted.

In addition, a fiber laser device according to the present invention is a fiber laser device including: any one of the optical fibers described above in which at least a part of a core is doped with an active element; a pumping light source configured to emit a pumping light beam that pumps the active element; a first FBG provided on one side of the optical fiber and configured to reflect the light beam at the predetermined wavelength in a light beam emitted from the active element pumped by the pumping light beam; and a second FBG provided on the other side of the optical fiber and configured to reflect a light beam at a wavelength the same as the wavelength of the light beam reflected off the first FBG at a reflectance lower than a reflectance of the first FBG.

According to the fiber laser device, in optical resonance, the light beam in the LP01 mode can be amplified while attenuating the light beam in the LP02 mode when a light beam is propagated through the core of the optical fiber, so that a light beam of excellent beam quality can be emitted.

Effect of Invention

As described above, according to the present invention, there is provided an optical fiber that can emit a light beam of excellent beam quality even in the case where the core diameter is great and a fiber laser device using the same.

DESCRIPTION OF EMBODIMENTS

Figure 1:
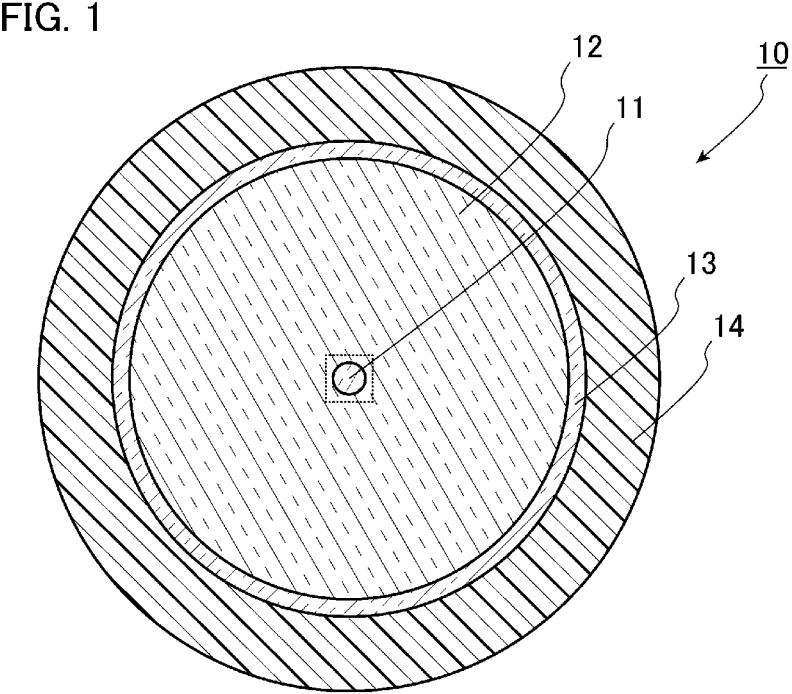
FIG. 1 is a diagram of the appearance of a cross section perpendicular to the longer direction of an optical fiber according to a first embodiment of the present invention.

In the following, a preferred embodiment of an optical fiber according to the present invention and a fiber laser device using the same will be described in detail with reference to the drawings. It is noted that for easy understanding, the scales in the drawings are sometimes different from the scales in the following description.

<Description of an Amplification Optical Fiber>

FIG. 1 is a diagram of the appearance of a cross section perpendicular to the longer direction of an optical fiber according to a first embodiment of the present invention.

The optical fiber according to the embodiment is an amplification optical fiber. As illustrated in FIG. 1, an amplification optical fiber 10 includes a core 11, a cladding 12 that encloses the outer circumferential surface of the core 11 with no gap, an outer cladding 13 that covers the outer circumferential surface of the cladding 12, and a buffer layer 14 that covers the outer cladding 13 as main configurations. The diameter of the core 11 is formed greater than the core diameter of a typical single mode fiber, which is 30 µm, for example. Moreover, the outer diameter of the cladding 12 is 420 µm, for example, and the outer diameter of the outer cladding 13 is 440 µm, for example.

Figure 2A:
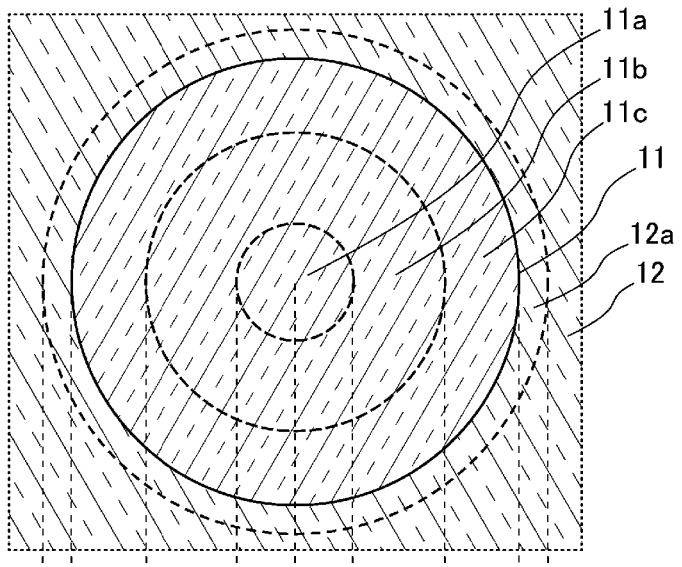
FIGS. 2A to 2E are diagrams of the refractive index, light intensity, Young's modulus, and active element distribution of the optical fiber in FIG. 1.
Figure 2B:
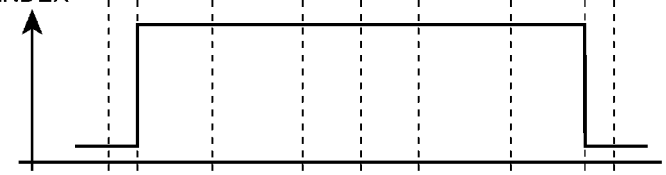
Figure 2C:
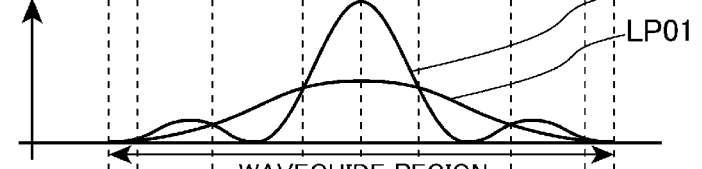
Figure 2D:
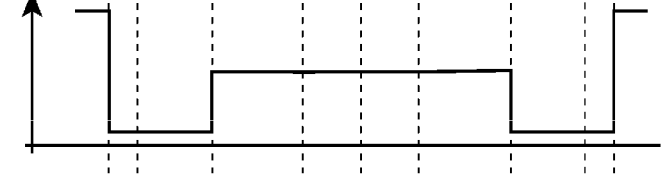
Figure 2E:
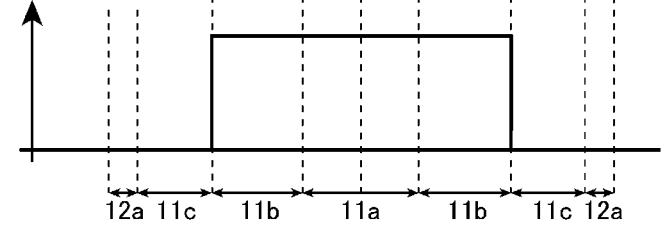

FIGS. 2A to 2E are diagrams of the appearance of the core 11 of the amplification optical fiber 10 and the surrounding portions in FIG. 1. More specifically, FIG. 2A is the core 11 and the cladding 12 in a region depicted by a dotted line in FIG. 1, FIG. 2B is a refractive index profile in the region illustrated in FIG. 2A, FIG. 2C is the intensity distributions of a light beam in the LP01 mode and a light beam in the LP02 mode in the case where the light beam in the LP01 mode and the light beam in the LP02 mode are normalized by power when the amplification optical fiber 10 propagates a light beam at a predetermined wavelength, FIG. 2D is the distribution of the magnitude of the Young's modulus in the region illustrated in FIG. 2A, and FIG. 2E is the distribution of the concentration of an active element in the region illustrated in FIG. 2A.

As illustrated in FIG. 2B, the refractive index of the cladding 12 is lower than the refractive index of the core 11. It is noted that although not illustrated in the drawing more specifically, the refractive index of the outer cladding 13 is lower than the refractive index of the cladding 12. Moreover, in the amplification optical fiber 10 according to the embodiment, the refractive index of the core 11 is constant in the radial direction, and the refractive index of the cladding is also constant in the radial direction. The relative refractive index difference between the core 11 and the cladding 12 is 0.15%, for example. The core 11 and the cladding 12 are formed of silica doped with a necessary dopant as described later, for example. The outer cladding 13 is formed of an ultraviolet curing resin or silica doped with a dopant that decreases the refractive index, for example. The buffer layer is formed of an ultraviolet curing resin different from one for the outer cladding, for example.

The amplification optical fiber 10 has the diameter of the core 11 greater than the diameter of a single mode fiber as described above, and is a multimode fiber that propagates a light beam through the core 11 including a light beam in the LP01 mode, which is a fundamental mode, as well as light beams in higher modes in axial symmetry. Therefore, for example, in the case where a light beam including only a light beam in the LP01 mode is entered to the core 11, light beams in higher modes in axial symmetry are sometimes excited. In this case, when a light beam at a predetermined wavelength is entered to the core 11, the modes of light beams propagated through the core 11 include the LP01 mode as well as the LP02 mode, an LP03 mode, and the like. In higher modes, the intensity of the light beam in the LP02 mode is generally greater than the intensities of light beams in other higher modes, and has a stronger influence. For this reason, in the embodiment, the light beam in the LP02 mode is taken into account in light beams in higher modes, whereas light beams in the LP03 mode and higher modes, which have smaller influence than the influence of the light beam in the LP02 mode, are not taken into account more specifically.

As described above, when a light beam including the light beam in the LP01 mode and the light beam in the LP02 mode is propagated through the core 11, the light beam in the LP01 mode and the light beam in the LP02 mode are propagated with intensity distributions as illustrated in FIG. 2C in the case where the light beam in the LP01 mode and the light beam in the LP02 mode are normalized by power. The wavelengths of the light beams are wavelengths at which an active element is stimulated to emit light in the case where the active element illustrated in FIG. 2E, for example, is pumped. The light beams in the modes have intensity distributions that become strongest in the center of the core 11. In the center, the intensity of the light beam in the LP02 mode is greater than the intensity of the light beam in the LP01 mode. Then, as apart from the center of the core 11 to the radial direction, the intensity of the light beam in the LP01 mode becomes greater than the intensity in the LP02 mode. Here, in FIG. 2C, a region in the radial direction from the center of the core 11 in which the intensity of the light beam in the LP01 mode is greater than the intensity of the light beam in the LP02 mode is defined as a first region 11a. Therefore, in the first region 11a, the intensity of the light beam in the LP02 mode is greater than the intensity of the light beam in the LP01 mode. As apart from the first region 11a further to the radial direction, the intensity of the light beam in the LP02 mode is again greater than the intensity of the light beam in the LP01 mode. Therefore, a region in which the intensity of the light beam in the LP01 mode is greater than the intensity of the light beam in the LP02 mode in a region on the circumferential side adjacent to the first region 11a is defined as a second region 11b. Then, as further apart from the second region 11b to the radial direction, the light beam is reached on the outer circumferential surface of the core 11. Therefore, on the circumferential side of the second region 11b in the core 11, the intensity of the light beam in the LP02 mode is greater than the intensity of the light beam in the LP01 mode. Therefore, a region on the circumferential side adjacent to the second region 11b in the core 11 is defined as a third region 11c.

Moreover, as illustrated in FIG. 2C, a light beam propagated through the optical fiber is extended and propagated from the core to the region in the cladding adjacent to the core. Therefore, an optical waveguide region is extended to the region in the cladding 12 adjacent to the core 11. In the embodiment, the optical waveguide region in the cladding 12 in FIG. 2C is defined as a fourth region 12a. In the fourth region 12a, the intensity of the light beam in the LP02 mode is greater than the intensity of the light beam in the LP01 mode.

Furthermore, in the amplification optical fiber 10, as illustrated in FIG. 2D, a Young's modulus in the third region 11c of the core 11 is smaller than a Young's modulus in the second region 11b. Moreover, in the embodiment, a Young's modulus in the fourth region 12a is equal to the Young's modulus in the third region 11c, and smaller than the Young's modulus in the second region 11b. Furthermore, in the embodiment, a Young's modulus in the first region 11a is equal to the Young's modulus in the second region 11b, and a Young's modulus on the circumferential side of the fourth region 12a of the cladding 12 is greater than the Young's modulus in the fourth region 12a.

A dopant that decreases a Young's modulus can include germanium (Ge), fluorine (F), boron (B), phosphorus (P), and the like. A dopant that increases a Young's modulus can include aluminum (Al). Among them, germanium, aluminum, and phosphorus are known as dopants that increase a refractive index, and fluorine and boron are known as dopants that decrease a refractive index.

Therefore, in order that the refractive index of the core 11 in the radial direction is constant and the Young's modulus in the third region 11c is smaller than the Young's modulus in the first region 11a and the Young's modulus in the second region 11b as described above, the following configuration may be fine, for example. In other words, it may be fine that the first region 11a and the second region 11b are formed of silica doped with germanium at a predetermined concentration, the third region 11c is formed of silica doped with germanium at a concentration higher than the concentrations in the first region 11a and the second region 11b as well as doped with fluorine, and the loadings of germanium and fluorine are adjusted in such a manner that the refractive index in the third region 11c is equal to the refractive indexes in the first region 11a and the second region 11b. At this time, dopants other than ones described above may be doped to the first region 11a and the second region 11b as necessary.

Moreover, in order that the refractive index of the cladding 12 in the radial direction is constant, the Young's modulus in the fourth region 12a is equal to the Young's modulus in the third region 11c, and the Young's modulus in the region on the circumferential side of the fourth region 12a of the cladding 12 is greater than the Young's modulus in the fourth region 12a as described above, the following configuration may be fine, for example. In other words, the region on the circumferential side of the fourth region 12a of the cladding 12 is formed of pure silica doped with no dopant more specifically, the fourth region 12a is formed of silica doped with fluorine and germanium, the refractive index in the fourth region 12a is the refractive index of pure silica, and the loadings of fluorine and germanium are adjusted in such a manner that the Young's modulus in the fourth region 12a is equal to the Young's modulus in the third region 11c. In addition, dopants other than ones described above may be doped to the fourth region 12a as necessary.

As in the third region 11c and the fourth region 12a, a dopant that increases a refractive index as well as decreases a Young's modulus and a dopant that decreases a refractive index as well as decreases a Young's modulus are doped together, so that the Young's modulus can be decreased as well as the refractive index can be set in a desired state.

Moreover, as illustrated in FIG. 2E, in the amplification optical fiber 10 according to the embodiment, an active element is doped to the first region 11a and the second region 11b, and any active element is not doped to the third region 11c and the cladding. The active element is an element that is pumped by a pumping light beam, typically including ytterbium (Yb). It is noted that active elements like this include a rare earth element such as neodymium (Nd) and erbium (Er) in addition to ytterbium (Yb). Furthermore, active elements can include bismuth (Bi) in addition to a rare earth element. It is noted that the concentration of the active element doped to the first region 11a and the second region 11b is $16 \times 10^{25}$ (parts/m$^3$) in the case where the activity limit is imposed by ytterbium, for example.

When a light beam is entered to the core 11 of the amplification optical fiber 10 described above, the light beam is propagated as described below. The wavelength of the light beam is a predetermined wavelength at which a pumped active element is stimulated to emit light as described above. In the case where an active element is ytterbium, the wavelength is 1,070 nm, for example.

In the core 11 in which an incident light beam can be propagated as a light beam including the light beam in the LP01 mode and the light beam in the LP02 mode, when a light beam including at least the light beam in the LP01 mode is entered to the core 11, at least the LP02 mode is excited. Therefore, in the case where the light beam in the LP01 mode and the light beam in the LP02 mode are normalized by power, the light beam in the LP01 mode and the light beam in the LP02 mode have the intensity distributions as illustrated in FIG. 2C, and are propagated through the amplification optical fiber 10. However, since the Young's moduli in the third region 11c and the fourth region 12a are smaller than the Young's moduli in the first region 11a and the second region 11b, acoustic waves are gathered in the third region 11c and the fourth region 12a. Moreover, in the embodiment, the Young's modulus of the cladding 12 on the circumferential side of the fourth region is greater than the Young's modulus in the fourth region 12a. For this reason, it is suppressed that acoustic waves are spread and transmitted to the regions other than the fourth region 12a of the cladding 12, and such a tendency is observed that acoustic waves are gathered in the fourth region 12a and the third region 11c. Therefore, stimulated Brillouin scattering is caused mainly in the third region 11c and the fourth region 12a. Thus, light beams propagated through the regions are attenuated due to stimulated Brillouin scattering. In the regions, since the intensity of the light beam in the LP02 mode is greater than the intensity of the light beam in the LP01 mode as described above, the loss of the light beam in the LP02 mode caused by stimulated Brillouin scattering is greater than the loss of the light beam in the LP01 mode. In this manner, incident light beams to the core 11 are propagated as the light beam in the LP02 mode is attenuated more than the light beam in the LP01 mode. Moreover, in the third region 11c and the fourth region 12a, the intensity of the light beam in the LP01 mode is not great so much. Therefore, in the incident light beam to the core 11, the light beam in the LP01 mode is not attenuated so much.

Furthermore, when a light beam at a predetermined wavelength is entered to the core 11 of the amplification optical fiber 10 as described above and a light beam at a wavelength at which an active element is pumped is entered to the cladding 12, the incident light beam to the core 11 is amplified as follows. In other words, the pumping incident light beam to the cladding 12 is mainly propagated through the cladding 12, and the active element doped to the core 11 is pumped when the pumping light beam is passed through the core 11. The pumped active element is stimulated to emit light due to a light beam at a predetermined wavelength entered to the core 11 and propagated through the core 11, and the light beam at the predetermined wavelength propagated through the core 11 is amplified by this stimulated emission. At this time, the active element is doped to the first region 11a and the second region 11b of the core 11, the active element is not doped to the third region 11c in which the intensity of the light beam in the LP02 mode is greater than the intensity of the light beam in the LP01 mode, and the light beam is propagated as described above as the light beam in the LP02 mode is attenuated more than the light beam in the LP01 mode. Therefore, in the case of comparison with an amplification optical fiber in which an active element is uniformly doped to the core, in accordance with the amplification optical fiber 10 according to the embodiment, the light beam in the LP01 mode is more efficiently amplified than the light beam in the LP02 mode and emitted.

At this time, it is preferable to satisfy Expression (1) below.

$$\int_0^b n(r) \times \{I_{01}(r) - I_{02}(r)\} r\, dr > 0 \qquad (1)$$

However, r is a distance from the center of the core 11 in the radial direction, $I_{01}(r)$ is the intensity of the light beam in the LP01 mode illustrated in FIG. 2C on the distance r from the center of the core 11 in the radial direction, $I_{02}(r)$ is the intensity of the light beam in the LP02 mode illustrated in FIG. 2C on the distance r from the center of the core 11 in the radial direction, n(r) is the doping concentration of the active element on the distance r from the center of the core 11 in the radial direction, and b is the radius of the core 11. It is noted that the unit of r is (m), the unit of $I_{01}(r)$ and $I_{02}(r)$ is (W/m$^2$), the unit of n(r) is (parts/m$^3$), and the unit of b is (m).

In the case where Expression (1) is satisfied, a light beam is amplified in such a manner that the power of the light beam in the LP01 mode in the light beam to be emitted is greater than the power of the light beam in the LP02 mode, and the beam quality of the light beam to be emitted is further improved.

As described above, in accordance with the amplification optical fiber 10 according to the embodiment, the incident light beam to the core 11 can be amplified as the light beam in the LP02 mode is attenuated while suppressing the loss of the light beam in the LP01 mode, so that a light beam of excellent beam quality can be emitted.

<Description of a Fiber Laser Device>

Figure 3:
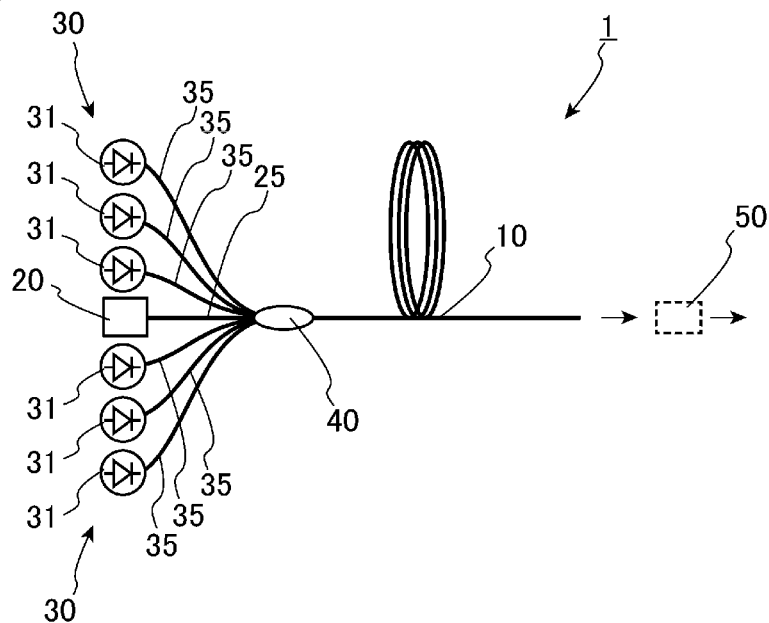
FIG. 3 is a diagram of a fiber laser device using the optical fiber in FIG. 1.

Next, a fiber laser device using the amplification optical fiber 10 described above will be described with reference to FIG. 3. FIG. 3 is a diagram of a fiber laser device according to the embodiment. As illustrated in FIG. 3, a fiber laser device 1 according to the embodiment includes a seed light source 20 that emits a light beam to be a seed light beam, a pumping light source 30 that emits a pumping light beam, an optical combiner 40 that receives the seed light beam and the pumping light beam, and the amplification optical fiber 10 in FIG. 1 that receives the seed light beam and the pumping light beam emitted from the optical combiner 40 as main configurations.

The seed light source 20 is configured of a semiconductor laser device or a fiber laser device such as a Fabry-Perot laser device and a fiber ring laser device, for example. The seed light source 20 is configured to emit a light beam at a predetermined wavelength including the light beam in the LP01 mode from the optical fiber. Moreover, this predetermined wavelength is not limited more specifically. The predetermined wavelength is a wavelength at which an active element doped to the amplification optical fiber 10 can be stimulated to emit light. For example, in the case where an active element is ytterbium (Yb) as described above, the wavelength is 1,070 nm.

Furthermore, the light beam emitted from the seed light source 20 is emitted from a single mode fiber 25 formed of a core and a cladding that encloses the core. The single mode fiber 25 propagates the light beam emitted from the seed light source 20 as a single mode light beam formed of the light beam in the LP01 mode. The configuration of the single mode fiber 25 is not limited more specifically. For example, in the case where the wavelength of the seed light beam is 1,070 nm as described above, the core diameter is 10 μm, and the relative refractive index difference between the core and the cladding is 0.13%.

The pumping light source 30 is configured of a plurality of laser diodes 31. In the embodiment, the laser diode 31 is a Fabry-Perot semiconductor laser having a GaAs semiconductor material, for example, and emits a light beam having a center wavelength of 915 nm. Moreover, the laser diodes 31 of the pumping light source 30 are individually connected to multimode fibers 35, and a pumping light beam emitted from the laser diode 31 is propagated through the multimode fiber 35 as a multimode light beam.

The optical combiner 40 to which the multimode fiber 35 and the single mode fiber 25 are connected is configured in which a portion disposed with the multimode fibers around the single mode fiber 25 is molten and extended for integration. The core of the single mode fiber 25 is optically coupled to the core 11 of the amplification optical fiber 10, and the core of the multimode fiber 35 is optically coupled to the cladding 12 of the amplification optical fiber 10.

Next, the operation of the fiber laser device 1 will be described.

First, a seed light beam emitted from the seed light source 20 is emitted from the single mode fiber 25. The wavelength of the seed light beam is 1,070 μm, for example, as described above. At this time, in the configuration of the single mode fiber 25 described above, the seed light beam including the LP01 mode is propagated. Then, the seed light beam propagated through the single mode fiber 25 is entered to the optical combiner 40.

Moreover, a pumping light beam that pumps the active element doped to the core 11 of the amplification optical fiber 10 is emitted from the pumping light source 30. The wavelength at this time is a wavelength of 915 μm, for example, as described above. Then, the pumping light beam emitted from the pumping light source 30 is propagated through the multimode fiber 35, and entered to the optical combiner 40.

The seed light beam entered from the optical combiner 40 to the core 11 of the amplification optical fiber 10 is propagated through the core 11. The pumping light beam entered from the optical combiner 40 to the cladding 12 of the amplification optical fiber 10 is mainly propagated through the cladding 12 to pump the active element doped to the core 11. The pumped active element is stimulated to emit light caused by the seed light beam, and the seed light beam is amplified. At this time, as in the description of the amplification optical fiber 10 above, the seed light beam sometimes excites a light beam in an axial symmetry mode. Even in the case where the light beam in the LP02 mode is excited, the light beam in the LP02 mode is mainly attenuated in the third region 11c and the fourth region 12a of the amplification optical fiber 10, and the light beam in the LP02 mode is more attenuated than the light beam in the LP01 mode as a whole. Then, as compared with an amplification optical fiber in which an active element is uniformly doped to the entire core, the light beam in the LP01 mode is more efficiently amplified than the light beam in the LP02 mode, and the light beam in the LP01 mode is emitted. Therefore, a light beam of excellent beam quality that the intensity of the light beam in the LP02 mode is suppressed is emitted from the amplification optical fiber 10.

As described above, in accordance with the fiber laser device 1 according to the embodiment, the light beam in the LP01 mode can be amplified in the amplification optical fiber 10 while attenuating the light beam in the LP02 mode, so that a light beam of excellent beam quality can be emitted.

Moreover, in the fiber laser device 1 according to the embodiment, the single mode light beam including the light beam in the LP01 mode is entered as a seed light beam to the amplification optical fiber 10, so that the power of the LP02 mode to be excited can be suppressed to be small, and the LP01 mode can be amplified more greatly. Therefore, a light beam of excellent beam quality can be emitted.

<Description of another Example of the Fiber Laser Device>

Next, another example of the fiber laser device will be described in detail with reference to FIG. 4. It is noted that components the same as or equivalent to ones in the description of the fiber laser device 1 above are designated the same reference numerals and signs, and overlapping description is omitted, unless otherwise specified.

Figure 4:
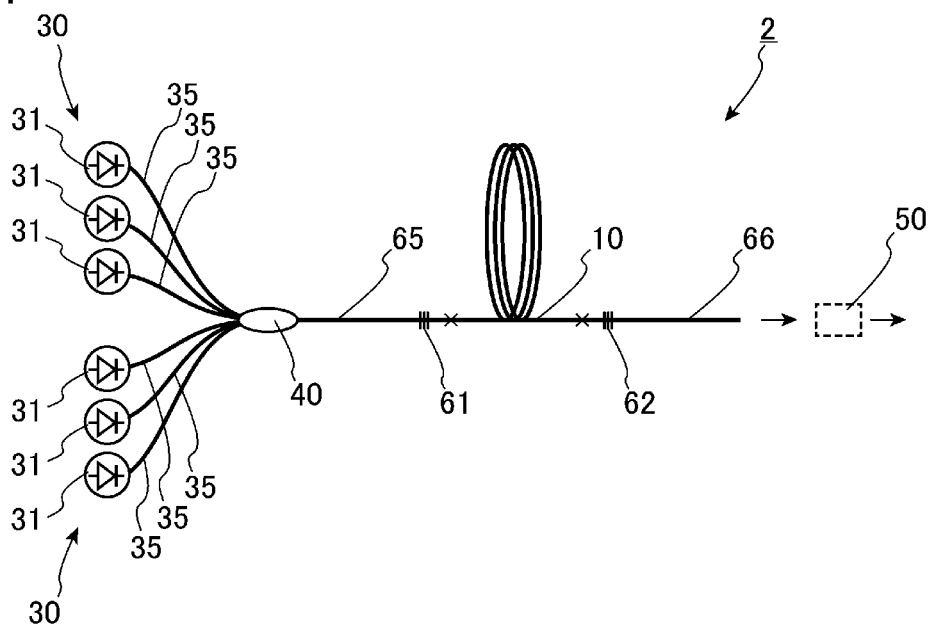
FIG. 4 is a diagram of another fiber laser device using the optical fiber in FIG. 1.

FIG. 4 is a diagram of another example of the fiber laser device according to the embodiment. As illustrated in FIG. 4, a fiber laser device 2 according to the embodiment includes a pumping light source 30, an amplification optical fiber 10, an optical combiner 40, a double cladding fiber 65 provided between the amplification optical fiber 10 and the optical combiner 40, a first FBG 61 provided on the double cladding fiber 65, a multimode fiber 66 provided on the opposite side of the double cladding fiber 65 of the amplification optical fiber 10, and a second FBG 62 provided on the multimode fiber 66 as main configurations.

The double cladding fiber 65 has a structure in a cross section perpendicular to the longer direction similar to the structure of the amplification optical fiber 10, including a core, a cladding that encloses the outer circumferential surface of the core with no gap, an outer cladding that encloses the outer circumferential surface of the cladding, and a buffer layer that encloses the outer cladding. The outer diameters, the refractive indexes, the Young's moduli, and the like of the core, the cladding, and the outer cladding of the double cladding fiber 65 are similar to the outer diameters, the refractive indexes, the Young's moduli, and the like of the core, the cladding, and the outer cladding of the amplification optical fiber 10. However, the double cladding fiber 65 is different from the amplification optical fiber 10 in that no active element is doped to the core of the double cladding fiber 65. Since the core and cladding of the double cladding fiber 65 have Young's moduli similar to the Young's moduli of the core and cladding of the amplification optical fiber 10, when a light beam including the light beam in the LP01 mode and the light beam in the LP02 mode is propagated through the core of the double cladding fiber 65, the light beam in the LP02 mode is more attenuated than the light beam in the LP01 mode similarly to the description of the amplification optical fiber 10. In other words, in the optical fiber according to the present invention, an active element is not necessarily doped to the core, and the double cladding fiber 65, as well as the amplification optical fiber 10, is the optical fiber according to the present invention.

One end of the double cladding fiber 65 is connected to the optical combiner 40 similarly to the fiber laser device 1 in which the amplification optical fiber 10 is connected to the optical combiner 40, and the core of the multimode fiber 35 is optically connected to the cladding of the double cladding fiber 65. Moreover, the other end of the double cladding fiber 65 is connected to one end of the amplification optical fiber 10, the core of the double cladding fiber 65 is connected to the core 11 of the amplification optical fiber 10, and the cladding of the double cladding fiber 65 is connected to the cladding 12 of the amplification optical fiber 10.

Furthermore, the first FBG 61 is provided on the core of the double cladding fiber 65. In this manner, the first FBG 61 is provided on one side of the amplification optical fiber 10. In the first FBG 61, a portion in which the refractive index is high is repeated along the longer direction of the double cladding fiber 65 in constant cycles. The first FBG 61 is configured in which at least a part of wavelengths of a light beam emitted from the pumped active element of the amplification optical fiber 10 is reflected by adjusting the cycle. In the case where an active element is ytterbium as described above, the reflectance of the first FBG 61 is 100%, for example, at a wavelength of 1,070 nm, for example.

In addition, the multimode fiber 66 provided on the opposite side of the double cladding fiber 65 of the amplification optical fiber 10 includes a core and a cladding that encloses the outer circumferential surface of the core with no gap. The outer diameters, the refractive indexes, the Young's moduli, and the like of the core and cladding of the multimode fiber 66 are similar to the outer diameters, the refractive indexes, the Young's moduli, and the like of the core and cladding of the amplification optical fiber 10. However, no active element is doped to the core of the multimode fiber 66. In other words, the multimode fiber 66 is different from the amplification optical fiber 10 in that no active element is doped to the core and the outer cladding is not included. However, since the core and cladding of the multimode fiber 66 have Young's moduli similar to the Young's moduli of the core and cladding of the amplification optical fiber 10, when a light beam including the light beam in the LP01 mode and the light beam in the LP02 mode is propagated through the core of the multimode fiber 66, the light beam in the LP02 mode is more attenuated than the light beam in the LP01 mode, similarly to the description of the amplification optical fiber 10. In other words, the multimode fiber 66, as well as the amplification optical fiber 10 and the double cladding fiber 65, is the optical fiber according to the present invention.

One end of the multimode fiber 66 is connected to the other end of the amplification optical fiber 10, and the core 11 of the amplification optical fiber 10 is connected to the core of the multimode fiber 66. Moreover, in the embodiment, the other end of the multimode fiber 66 is a free end as nothing is connected.

Furthermore, the second FBG 62 is provided on the core of the multimode fiber 66. In this manner, the second FBG 62 is provided on the other side of the amplification optical fiber 10. In the second FBG 62, a portion in which the refractive index is high is repeated along the longer direction of the multimode fiber 66 in constant cycles. The second FBG 62 is configured in which a light beam at a wavelength the same as the wavelength of the light beam reflected off the first FBG 61 is reflected at a reflectance lower than the reflectance of the first FBG 61. For example, the second FBG 62 is configured in which a light beam at a wavelength the same as the wavelength of the light beam reflected off the first FBG 61 is reflected at a reflectance of 50%.

In the fiber laser device 2 as described above, when a pumping light beam is emitted individually from laser diodes 31 of the pumping light source 30, the pumping light beam is entered to the cladding of the double cladding fiber 65 in the optical combiner 40, and entered from the cladding of the double cladding fiber 65 to the cladding of the amplification optical fiber 10. Then, similarly to the fiber laser device 1, the active element doped to the core 11 of the amplification optical fiber 10 is pumped. Then, the pumped active element emits a light beam of spontaneous emission at a specific wavelength. The light beam of spontaneous emission at this time is a light beam including a wavelength of 1,070 nm, for example, and having a certain wavelength range. The light beam of spontaneous emission is propagated through the core 11 of the amplification optical fiber 10, reflected off the first FBG 61 provided on the core of the double cladding fiber 65. The reflected light beam is reflected off the second FBG 62 and resonates, and the resonating light beam is amplified when propagated through the core 11 of the amplification optical fiber 10. At this time, in the amplification optical fiber 10, similarly to the fiber laser device 1, the light beam in the LP02 mode is attenuated while suppressing the loss of the light beam in the LP01 mode propagated through the core 11. Therefore, as compared with an amplification optical fiber in which an active element is uniformly doped to the entire core, the light beam in the LP01 mode is more efficiently amplified than the light beam in the LP02 mode. Moreover, even in the case where a resonating light beam is propagated through the cores of the double cladding fiber 65 and the multimode fiber 66, the light beam in the LP02 mode is attenuated while suppressing the loss of the light beam in the LP01 mode propagated through the core 11. In this manner, the light beam in the LP02 mode is attenuated, and the resonating light beam is amplified. Then, a part of the light beam is transmitted through the second FBG, and emitted from the multimode fiber 66. At this time, also in the light beam transmitted through the second FBG, the light beam in the LP02 mode is attenuated as the light beam is propagated through the multimode fiber 66.

In the fiber laser device 2 according to the example, the light beam in the LP02 mode is more attenuated than the light beam in the LP01 mode when the light beam is propagated through the core 11 of the amplification optical fiber 10 and when the light beam is propagated through the core of the double cladding fiber 65 and the core of the multimode fiber 66, so that a light beam of excellent beam quality can be emitted.

It is noted that as depicted by a broken line in FIGS. 3 and 4, it may be fine that a wavelength conversion element 50 that converts the wavelength of the light beam to be emitted is disposed on the path of a light beam emitted from the fiber laser devices 1 and 2.

The wavelength conversion element 50 is an element that converts the wavelength of an incident light beam into the long wavelength side and emits a light beam whose wavelength is converted. In the case where a near infrared light beam having a wavelength of 1,070 nm, for example, is entered, the element converts the wavelength of the light beam, and emits a visible light beam at a wavelength of 535 nm. The wavelength conversion element 50 can include an optical fiber that causes stimulated Raman scattering. The optical fiber that causes stimulated Raman scattering can include an optical fiber including a core doped with a dopant that increases a nonlinear optical constant. The dopant includes germanium and phosphorus. In this case, the wavelength conversion element 50 generally converts the wavelength in the case where a light beam of a predetermined intensity or greater is entered. The intensity threshold of the incident light beam whose wavelength is converted can be changed depending on the diameter of the core, the doping concentration of the dopant, the length, and the like. Alternatively, the wavelength conversion element 50 can include a wavelength conversion element formed of a single crystal of lithium niobate and lithium tantalate.

In the case where the wavelength conversion element 50 is disposed, light beams emitted from the amplification optical fiber 10 and the multimode fiber 66 are condensed at a lens not illustrated, and entered to the wavelength conversion element 50. At this time, a light beam of excellent beam quality is emitted from the amplification optical fiber 10 and the multimode fiber 66 as described above, so that the condensing characteristics of an incident light beam to the wavelength conversion element 50 can be improved. The condensing characteristics of the light beam are improved as described above, so that the power density of a light beam is increased, and the conversion efficiency of the wavelength conversion element 50 is improved.

As described above, the present invention is described as the embodiment is taken as an example. However, the present invention is not limited thereto.

For example, in the optical fiber according to the embodiment, the Young's modulus is smaller in the entire region of the third region 11c than the Young's modulus in the second region 11b. However, the present invention is not limited thereto. It may be fine that a part of the Young's modulus in the third region 11c is smaller than the Young's modulus in the second region 11b. In other words, the optical fiber according to the present invention includes the amplification optical fiber 10, the double cladding fiber 65, and the multimode fiber 66 as examples. However, the present invention is not limited thereto. The optical fiber is an optical fiber that propagates a light beam at a predetermined wavelength at least in the LP01 mode and the LP02 mode, and can be appropriately modified as long as at least a part of the Young's modulus in the third region 11c is smaller than the Young's modulus in the second region 11b. Therefore, it may be fine that light beams other than light beams in the LP01 mode and the LP02 mode are propagated through the optical fiber according to the present invention.

Figure 5:
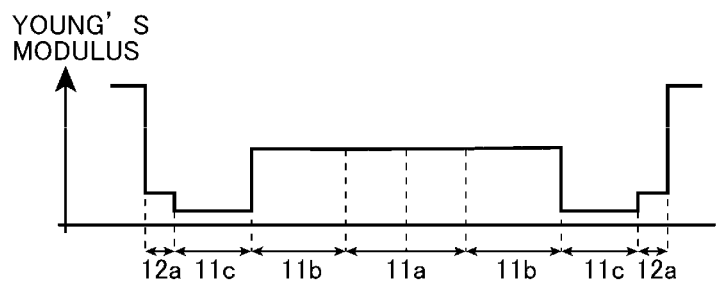
FIG. 5 is a diagram of another example of the distribution of the magnitude of the Young's modulus illustrated in FIG. 2D.

Moreover, in the amplification optical fiber 10, the double cladding fiber 65, and the multimode fiber 66 according to the embodiment, the Young's modulus in the third region 11c is equal to the Young's modulus in the fourth region 12a. However, it may be fine that the Young's moduli are different from each other. FIG. 5 is a diagram of an exemplary distribution of the magnitude of the Young's modulus in the case where the Young's modulus in the third region 11c and the Young's modulus in the fourth region 12a of the amplification optical fiber 10 are different from each other, which is a diagram corresponding to FIG. 2D. As illustrated in FIG. 5, in this example, the Young's modulus in the third region 11c is smaller than the Young's modulus in the fourth region 12a, and the Young's modulus in the fourth region 12a is smaller than the Young's moduli in the first region 11a and the second region 11b. It is noted that it may be fine that the distributions of the magnitude of the Young's moduli of the double cladding fiber 65 and the multimode fiber 66 are this distribution. In order to provide this distribution of the magnitude of the Young's modulus, it is fine that a dopant that increases a Young's modulus is doped to the fourth region 12a, for example. Alternatively, it may be fine to decrease the amount of a dopant that decreases a Young's modulus and is doped to the fourth region 12a. As described above, the Young's modulus in the third region 11c is smaller than the Young's modulus in the fourth region 12a, so that acoustic waves can be gathered more in the third region 11c than in the fourth region 12a. As also apparent from FIG. 2C, the difference between the intensity of the light beam in the LP02 mode and the intensity of the light beam in the LP01 mode is greater in the third region 11c than in the fourth region 12a. Therefore, acoustic waves are gathered more in the third region 11c than in the fourth region 12a to increase the influence of stimulated Brillouin scattering more in the third region 11c than in the fourth region 12a, so that the loss of the light beam in the LP02 mode can be more increased than the loss of the light beam in the LP01 mode. Accordingly, it is possible to further improve beam quality.

Figure 6:
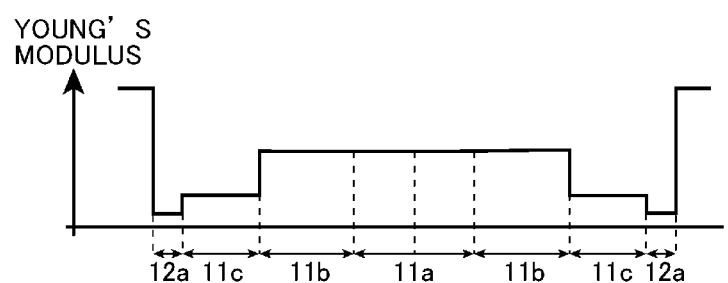
FIG. 6 is a diagram of still another example of the distribution of the magnitude of the Young's modulus illustrated in FIG. 2D.

Moreover, FIG. 6 is a diagram of another example of the distribution of the magnitude of the Young's modulus in the case where the Young's modulus in the third region 11c and the Young's modulus in the fourth region 12a of the amplification optical fiber 10 are different from each other, which is a diagram corresponding to FIG. 2D. As illustrated in FIG. 6, in this example, the Young's modulus in the fourth region 12a is smaller than the Young's modulus in the third region 11c. It is noted that it may be fine that the distributions of the magnitude of the Young's moduli of the double cladding fiber 65 and the multimode fiber 66 are this distribution. In order to provide this distribution of the magnitude of the Young's modulus, a dopant that decreases a Young's modulus may be doped to the fourth region 12a more than in the case where the Young's modulus in the third region 11c is the same as the Young's modulus in the fourth region 12a, for example. Acoustic waves can be gathered in the third region 11c because the Young's modulus is smaller than the Young's modulus in the second region 11b. The Young's modulus in the fourth region 12a is smaller than the Young's modulus in the third region 11c as described above, so that acoustic waves can be further apart from the second region 11b, and the influence of stimulated Brillouin scattering can be decreased in the second region 11b.

Furthermore, in the optical fiber according to the present invention, it may be fine that the Young's modulus on the circumferential side of the fourth region 12a of the cladding is the same as the Young's modulus in the fourth region 12a, or the Young's modulus in the fourth region 12a is the same as the Young's modulus on the circumferential side of the fourth region of the cladding. However, it can be suppressed that acoustic waves are spread and transmitted to the regions on the circumferential side of the fourth region 12a of the cladding, and the acoustic waves are more gathered in the fourth region 12a. Therefore, the Young's modulus on the circumferential side of the fourth region 12a of the cladding is preferably greater than the Young's modulus in the fourth region 12a as in the embodiment.

In addition, in the amplification optical fiber 10, the double cladding fiber 65, and the multimode fiber 66, it may be fine that the Young's modulus in the first region 11a and the Young's modulus in the second region 11b are different from each other.

Figure 7:
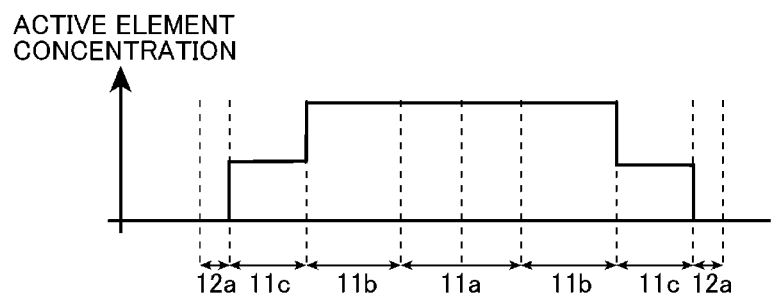
FIG. 7 is a diagram of the distribution of the concentration of an active element in the case where the active element is doped to a third region of an amplification optical fiber.

Moreover, in the amplification optical fiber 10, an active element is doped to the first region 11a and the second region 11b, and any active element is not doped to the third region 11c. However, the present invention is not limited thereto. FIG. 7 is a diagram of the distribution of the concentration of an active element in the case where the active element is doped to the third region 11c in the amplification optical fiber 10. As illustrated in FIG. 7, it may be fine that an active element is doped to the third region 11c. In this case, the concentration of the active element doped to the third region 11c is preferably smaller than the concentration of the active element doped to at least the second region 11b, and Expression (1) described above is more preferably satisfied. For example, the concentration of the active element Yb to be doped is $16 \times 10^{25}$ (parts/m$^3$) in the first region 11a and the second region 11b, and is $8\times10^{25}$ (parts/m$^3$) in the third region 11c.

Furthermore, in the embodiment described above, the refractive index of the core 11 is constant in the radial direction. However, the present invention is not limited thereto. It may be fine that at least one of the first region 11a, the second region 11b, and the third region 11c has a refractive index different from that in the other regions. For example, it may be fine that the refractive index in the third region 11c is higher than the refractive indexes in the first region 11a and the second region 11b. In this case, it may be fine that the first region 11a and the second region 11b are formed of silica doped with germanium at a predetermined concentration and the third region 11c is formed of silica doped with germanium at a concentration higher than the concentrations in the first region 11a and the second region 11b. In this form, since it is unnecessary to together dope dopants that the refractive index in the third region 11c is made the same as the refractive index of the first region 11a or the second region 11b, the optical fiber is easily manufactured. Alternatively, it may be fine that the refractive index in the third region 11c is lower than the refractive indexes in the first region 11a and the second region 11b and higher than the refractive index of the cladding 12 in order that the third region 11c functions as a part of the core 11. In this case, it may be fine that in a range in which the Young's modulus in the third region 11c is smaller than the Young's modulus in the second region 11b, the amount of germanium to be doped to the third region 11c is decreased in the embodiment or the amount of fluorine to be doped to the third region 11c is increased in the embodiment.

It is noted that in the embodiment described above, the refractive index of the cladding 12 is constant in the radial direction. However, it may be fine that the refractive index in the region on the circumferential side of the fourth region 12a is different from the refractive index in the fourth region 12a. For example, in the case where the region on the circumferential side of the fourth region 12a is formed of pure silica doped with no dopant, a dopant that decreases a Young's modulus and a refractive index is doped to the fourth region 12a, so that the refractive index in the fourth region 12a can be decreased more than the refractive index on the circumferential side of the fourth region. Moreover, it may be fine that a dopant that decreases a Young's modulus and a refractive index and a dopant that deceases a Young's modulus and increases a refractive index are together doped to the fourth region 12a and the refractive index in the fourth region 12a is increased more than the refractive index in the region on the circumferential side of the fourth region 12a in a range in which the fourth region 12a functions as the cladding.

Figure 8:
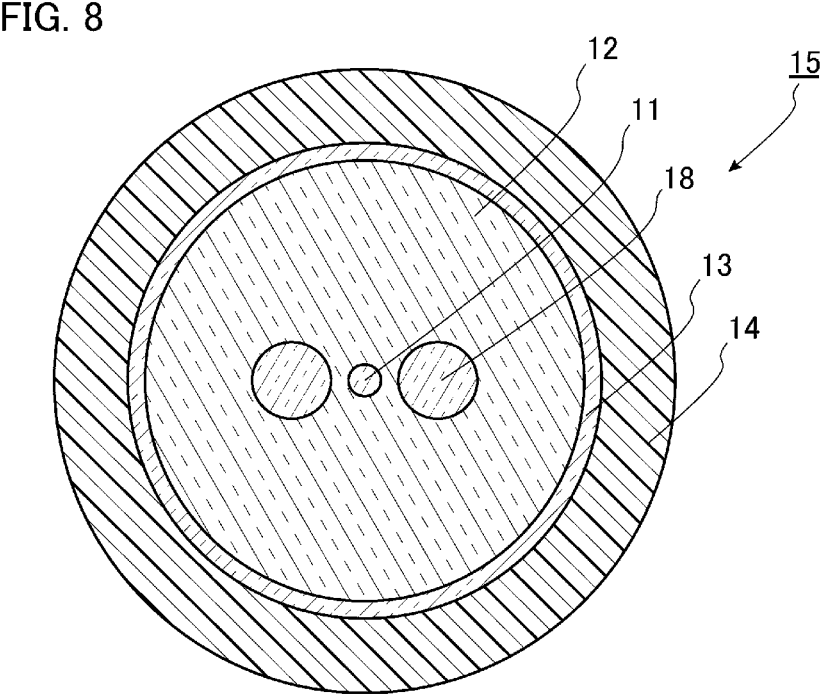
FIG. 8 is a diagram of an exemplary modification of an amplification optical fiber.

Furthermore, the amplification optical fiber 10 according to the embodiment described above has the structure in which only the core 11 is disposed in the cladding 12. However, the present invention is not limited thereto. For example, it may be fine that a pair of stress application parts is provided in the cladding 12 of the amplification optical fiber 10. FIG. 8 is a diagram of an exemplary modification of the amplification optical fiber 10 in this configuration. It is noted that components the same as or equivalent to the components of the embodiment are designated the same reference numerals and signs, and the overlapping description will be omitted unless otherwise specified.

In FIG. 8, an amplification optical fiber 15 is different from the amplification optical fiber 10 according to the first embodiment in that a pair of stress application parts 18 sandwiching a core 11 is provided in a cladding 12. In other words, the amplification optical fiber 15 according to the exemplary modification is a polarization maintaining fiber (a PANDA fiber). For example, as described above, in the case where the diameter of the core 11 is 30 μm and the relative refractive index difference between the core 11 and the cladding 12 is 0.15%, the stress application parts 18 have a diameter of 35 μm, for example, and a relative refractive index difference of −1% to the cladding 12, and are spaced from the outer circumferential surface of the core 11 with a gap of 5 μm. A material forming the stress application part 18 can include silica doped with boron (B), for example, as a dopant. These stress application parts 18 are provided, so that a light beam of single polarization can be propagated. This amplification optical fiber 15 can provide a polarization extinction ratio of about 20 dB between an incident light beam to the core 11 and a light beam emitted from the core 11.

The light beam of single polarization is emitted, so that wavelengths can be efficiently converted with a light beam emitted as compared with the case where a light beam of no single polarization is emitted. For example, in the optical fiber amplifier 1 in FIG. 3, wavelengths can be efficiently converted in the wavelength conversion element 50 in the case where the amplification optical fiber 15 is used instead of the amplification optical fiber 10. Moreover, also in the resonator illustrated in FIG. 4, the amplification optical fiber 15 is used instead of the amplification optical fiber 10, and similar stress application parts are disposed on the claddings of the double cladding fiber 65 and the multimode fiber 66, so that a light beam whose wavelength is converted can be efficiently obtained in the wavelength conversion element 50.

INDUSTRIAL APPLICABILITY

As described above, according to the present invention, an optical fiber that can emit a light beam of excellent beam quality even in the case where the core diameter is great and a fiber laser device using the same are provided, and are expected to be used in a processing fiber laser device and the like.

REFERENCE SIGNS LIST 1, 2 . . . fiber laser device
10 . . . amplification optical fiber
11 . . . core
11a . . . first region
11b . . . second region
11c . . . third region
12 . . . cladding
12a . . . fourth region
13 . . . outer cladding
14 . . . buffer layer
15 . . . amplification optical fiber
18 . . . stress application part
20 . . . seed light source
25 . . . single mode fiber
30 . . . pumping light source
31 . . . laser diode
35 . . . multimode fiber
40 . . . optical combiner
50 . . . wavelength conversion element
65 . . . double cladding fiber
66 . . . multimode fiber

The invention claimed is:

1. An optical fiber comprising:
a core and a cladding that encloses the core, the optical fiber being configured to propagate a light beam at a predetermined wavelength at least in an LP01 mode and an LP02 mode,
wherein the core includes a first region and a second region, the first region being located on a circumferential side of the second region, in the first region an intensity of the light beam in the LP02 mode being greater than an intensity of the light beam in the LP01 mode and in the second region the intensity of the light beam in the LP01 mode being greater than the intensity of the light beam in the LP02 mode, and
wherein at least a part of a Young's modulus in the first region is smaller than a Young's modulus in the second region so as to gather acoustic waves in the first region of the core to attenuate the light beam in the LP02 mode.

2. The optical fiber according to claim 1, wherein a Young's modulus in an entire first region is smaller than the Young's modulus in the second region.

3. The optical fiber according to claim 1, wherein a refractive index of the core is constant in a radial direction.

4. The optical fiber according to claim 1, wherein at least a part of a Young's modulus in a waveguide region in the cladding through which the light beam at the predetermined wavelength is propagated is smaller than the Young's modulus in the second region.

5. The optical fiber according to claim 4, wherein a Young's modulus in all of the waveguide region in the cladding is smaller than the Young's modulus in the second region.

6. The optical fiber according to claim 5, wherein at least a part of a Young's modulus in the first region is smaller than the Young's modulus in the waveguide region in the cladding.

7. The optical fiber according to claim 4, wherein a refractive index of the cladding is constant in a radial direction.

8. The optical fiber according to claim 1, wherein in the first region, a dopant that increases a refractive index as well as decreases a Young's modulus and a dopant that decreases a refractive index as well as decreases a Young's modulus are doped together.

9. The optical fiber according to claim 1, wherein at least a part of the core is doped with an active element that is stimulated to emit the light beam at the predetermined wavelength.

10. The optical fiber according to claim 9, wherein at least a part of the second region is doped with the active element at a concentration higher than in the first region.

11. The optical fiber according to claim 10, wherein the first region is not doped with any active element.

12. The optical fiber according to claim 8, wherein a pair of stress application parts sandwiching the core is provided in the cladding.

13. A fiber laser device comprising:
the optical fiber according to claim 8;
a seed light source configured to emit a seed light beam at the predetermined wavelength to be entered to the core; and
a pumping light source configured to emit a pumping light beam that pumps the active element.

14. The fiber laser device according to claim 13, wherein the seed light beam excites only an axial symmetry mode in the optical fiber.

15. A fiber laser device comprising:
the optical fiber according to claim 8;
a pumping light source configured to emit a pumping light beam that pumps the active element;
a first FBG provided on one side of the optical fiber and configured to reflect the light beam at the predetermined wavelength in a light beam emitted from the active element pumped by the pumping light beam; and
a second FBG provided on the other side of the optical fiber and configured to reflect a light beam at a wavelength the same as a wavelength of the light beam reflected off the first FBG at a reflectance lower than a reflectance of the first FBG.

16. The optical fiber according to claim 2, wherein a refractive index of the core is constant in a radial direction.

17. The optical fiber according to claim 2, wherein at least a part of a Young's modulus in a waveguide region in the cladding through which the light beam at the predetermined wavelength is propagated is smaller than the Young's modulus in the second region.

18. The optical fiber according to claim 3, wherein at least a part of a Young's modulus in a waveguide region in the cladding through which the light beam at the predetermined wavelength is propagated is smaller than the Young's modulus in the second region.

19. The optical fiber according to claim 5, wherein a refractive index of the cladding is constant in a radial direction.

20. The optical fiber according to claim 6, wherein a refractive index of the cladding is constant in a radial direction.

* * * * *